Dec. 7, 1926.
W. H. DICKERSON
1,609,993
PROCESS OF DESICCATION AND PRODUCTS OBTAINED THEREBY
Filed Nov. 3, 1922
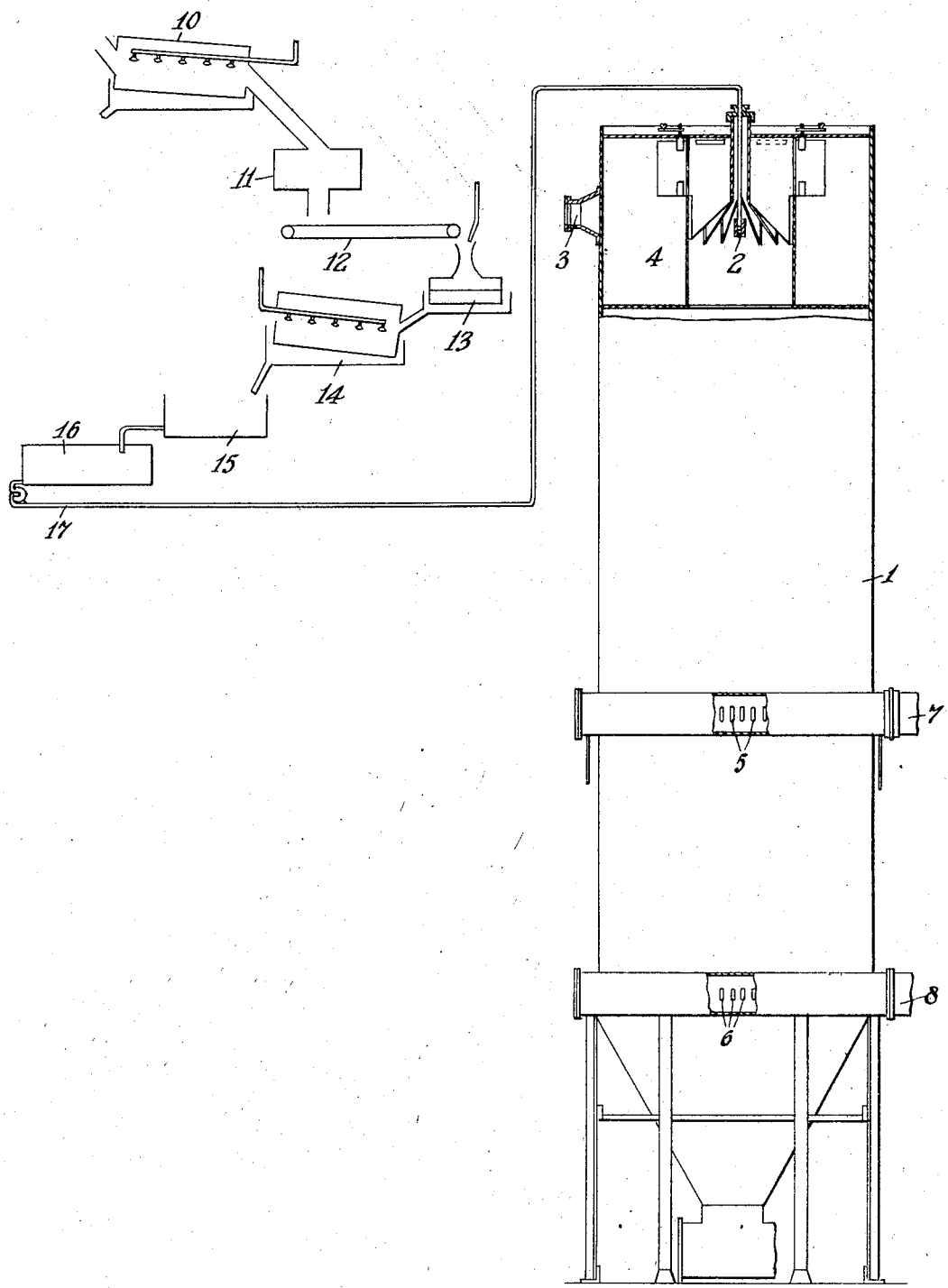
INVENTOR
Walter H. Dickerson
BY
ATTORNEY Patented Dec. 7, 1926.

UNITED STATES PATENT OFFICE.

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE.

PROCESS OF DESICCATION AND PRODUCTS OBTAINED THEREBY.

Application filed November 3, 1922. Serial No. 598,745.

The invention relates to a novel process for the drying of slurries or suspensions of finely divided solids in a liquid medium, such as water.

It has for its object to so conduct the desiccation of these slurries or suspensions that decided economies will be effected in the drying operation, and, furthermore, that many finished products with improved properties will result. The present application is a continuation in part of a previous application for U. S. patent, filed by me August 2, 1922, Serial No. 579,297.

As theretofore conducted, the drying of slurries or suspensions of finely divided solids in a liquid medium, such as water, is effected by removing as much of the water as possible therefrom by filtration, or by allowing the suspended matter to settle from the liquid carrying medium. The resultant cake or sediment is then dried and ground to the desired degree of fineness.

I have found, however, that not only may decided economies in the drying operation be effected by spray-drying or atomizing such slurries or suspensions, but many of the finished products obtained thereby possess properties not found in materials dried by the well-known methods.

I am aware that solutions of solids have been dried by spraying or atomizing same into a gaseous desiccating medium; but, with such solutions, the solids are developed from the solutions and the fineness of the finished product is under control. With slurries or suspensions, however, the solid particles are already formed; and it is necessary to so conduct the process that the mass of material being dried is properly broken up during the desiccating operation in such a manner that each individual particle is separated and exposed to the desiccating action.

To this end, the slurry or suspension of material is provided in a condition sufficiently fluid to be forced thru a pipe and is then sprayed or atomized by, for example air, to break up the slurry or suspension to as high a degree as possible and deliver same into a gaseous drying medium. This medium is maintained at a temperature sufficiently high to effect a drying action while the particles are suspended therein. It will be noted that the rapid or intense evaporation thus set up from the individual particles will cause a distinct refrigerating action on a particle; and, furthermore, evaporation from the interior of the particle causes, in many instances, the particles to dry in a porous or expanded state. The amount of this evaporation, moreover, may be so adjusted with relation to the amount of solid that the final temperature after completion of drying will be at any desired point. As a rule, this temperature will approximate 200° F. but the same will depend largely on the amount of moisture it is desired to retain in the finished product and the ease with which the moisture is freed from the solid. Should, however, the material being desiccated have a low critical temperature, the desiccating operation may be so conducted that the particles immediately upon drying will be chilled below the critical point or temperature condition above which it would be subject, for example, to decomposition. This could be effected, as is set forth in my said copending application, by conducting the particles into a zone of cooling gas.

As an example, with products such as the starches obtained from corn, potatoes, bananas or other well-known sources, it is desirable that the substance thereof be not altered by the disiccating operation; although, I have found that the physical characteristic of the starch granules after the novel treatment are improved. For example, the starch granules are of a more open and porous structure so that the starch absorbs water much more rapidly and is more readily worked; also, operates as a better loading and working medium for yeast and digests and dissolves more readily when heated in water. A microscopical examination of the product fails to disclose any deviation in structure in the hilum or coating of the starch granules and the concentric stratified structure appears to be untouched. The physical appearance, however, shows marked differences over the natural product, the product being found to be somewhat granular, non-cohesive and non-adhesive. Furthermore, there appears to be no evidence of starch inversion nor loss of gelatinizing power of starch by the action of the high temperature to which the same has been subjected.

In the preparation of starch of this character, the starch granules are abstracted by water in the usual manner from the particular natural product furnishing same; and the slurry thus obtained is sprayed, or preferably atomized, as by compressed air or other atomizing gaseous medium, to as high a degree as possible. This serves to break up the mass into its ultimate individual particles which are each exposed to a rapid drying action, for example, by causing the atomized liquid to be discharged into the gaseous drying medium as waste flue gases heated to the proper temperature. In the case of the production of starch powder by this method, I have found that an atomizing pressure of from 1000–1200 lbs. per square inch and temperatures up to 1000° F. of the gaseous drying medium, such as waste flue gases or air, produce satisfactory results. It will be understood, of course, that the pressure will vary with the size of the orifice of the nozzle employed and the character of the material to be dried, and which must be completely broken up for the desiccating action thereon.

The drying action is extremely rapid, so that each particle dried is subject only momentarily or for a very short period of time to the apparently high temperature; and, as noted hereinbefore, the intense evaporation of the moisture present on, or in, the particle, will cause a distinct refrigeration action as well as an evaporation from the interior of the particle to cause same to dry in a porous state.

The novel process may be carried out, for example, in a vertically disposed drying chamber provided by the cylindrical casing 1 which is shown in the drawing, said casing being of appropriate dimensions and into the top of which the material to be dried, and which is in a more or less liquid condition, is sprayed thru a spray nozzle 2 of any well-known or special type. Simultaneously therewith, heated gas of the proper degree of temperature is introduced thru the top of the casing about the spray nozzle 2, being supplied thru a duct 3 and distributing compartment 4. The material thus sprayed becomes quickly dried into small globular particles which in their further travel thru the drying chamber are arranged to pass thru a cooling zone or zones to chill the same to the desired final temperature, preliminary to withdrawal from said casing. These zones may conveniently be provided thru the medium of one or more sets of annular openings 5 and 6 respectively disposed in the wall of the casing one at its lower portion and thru which a gaseous cooling medium may be directed from suitable supply ducts 7 and 8, respectively.

When required, as in the working up of the dry starch powder from material such as bananas, the raw material is first prepared, in manner well understood, as in a revolving screen 10 for scrubbing the raw stock, then brought into a clipper or cutter 11 for reducing its size and from which it is delivered as by a belt conveyor 12 to a burr mill 13 for pulping. After being thoroughly pulped therein, it is screened in the screening device 14 to free the pulp mass from fibrous material, after which it may thoroughly be washed as in the washing tank 15, then delivered to a settling tank 16 connected with the spray nozzle 2. The pulpy mass is then sprayed or atomized, as hereinbefore set forth, to produce a pure banana flour from green bananas.

If ripe bananas be used for this purpose, a similar product may be obtained which I term "banana sugar". Although ripe bananas are not entirely composed of sugar, yet a large proportion of the original starches of the green fruit have been converted into sugars, the ripe bananas containing not only such sugars, but starch and a number of substances in various intermediate stages of the conversion of starches into sugars. Such products may thus be provided in dry condition in an unaltered state.

I claim:—

1. The method of preparing a dry banana starch, which consists in pulping bananas, working same into a liquid of uniform consistency, freeing the mass from fibrous material, breaking up the pulp, and exposing the individual particles in this condition to a desiccating gaseous medium.

2. The method of preparing a dry banana starch, which consists in pulping bananas, working same into a liquid of uniform consistency, freeing the mass from fibrous material, finely subdividing the pulp, exposing the individual particles in this condition to a desiccating gaseous medium, and cooling the desiccated particles immediately at the completion of the drying operation.

3. The method of converting a solid material into altered physical form, which comprises forming a free-flowing suspension of the said solid material in an appropriate liquid, breaking up the said free-flowing suspension into small independent drops by spraying, and drying the drops of the said free-flowing suspension in a gaseous drying medium.

4. The method of treating a solid material consisting principally of material insoluble in a liquid to convert it into an improved physical condition, which comprises mixing the said solid material in the liquid, treating said mixture to reduce the insoluble material therein to finely divided condition and to obtain a free-flowing liquid mass of uniform consistency, drying said free-flowing liquid mass into the form of a dry powder by projecting it in finely divided state into a gaseous drying medium, and collecting the dried material from the spent drying medium.

5. The method of treating starch, starch-containing material and the like to reduce it to an improved physical solid form, which comprises reducing the material to a finely divided uniform suspension in an amount of liquid such that the entire mass is perfectly free-flowing, atomizing the said free-flowing suspension and delivering the particles thereof into a current of drying gas to thereby directly produce a dried powdered product.

6. The method of drying a moisture-containing non-fluent material, which comprises adding additional liquid to said material in amount sufficient to permit the forming of a slurry, then forming a smooth slurry of the material in the said liquid and spraying said slurry into a gaseous drying medium and permitting it to remain in said medium until the drying of the material is complete.

7. The method of producing an organic substance in dry finely divided form, which comprises reducing the organic substance from solid form to a finely divided homogeneous free-flowing liquid mixture by adding water thereto and stirring, breaking up the said free-flowing liquid mixture into separate small particles, and drying the said particles by directing a current of a gaseous drying medium into intimate contact therewith.

Signed at New York in the county of New York and State of New York this 31st day of October A. D. 1922.

WALTER H. DICKERSON.